Patented Nov. 28, 1939

2,181,549

UNITED STATES PATENT OFFICE 2,181,549

PROCESS FOR THE IMPROVEMENT OF TEA FREE FROM OR POOR IN CAFFEINE AND IMPROVED DECAFFEINIZED TEA

Theodor Grethe, Hamburg, Germany

No Drawing. Application March 30, 1938, Serial No. 198,959. In Germany April 5, 1937

10 Claims. (Cl. 99—76)

The invention relates to a process for the improvement of tea free from or poor in caffeine.

It has been proposed for the production of caffeine-free tea to soak the tea leaves thoroughly with a sufficient quantity of water to cause the leaf cells to swell and to facilitate the entry of the caffeine solvent. The caffeine is then leached out with a solvent, for example methylene dichloride, and the tea free from caffeine or with reduced content of caffeine so obtained freed from the residue of the solvent and dried, in the course of which operation temperatures which can disadvantageously influence the flavour and the aroma of the untreated tea must be avoided.

In this way it is possible to obtain a tea free from caffeine or with reduced content of caffeine, the flavour of which is so good as not to differ appreciably from the starting material and to fulfil all requirements.

Particularly sensitive tea drinkers, however, note a difference as compared with untreated tea. This is so particularly in the case of teatasters whose tongues on testing caffeine-free tea temporarily lose their sensitivity.

This action on the nerves of the tongue is to be ascribed to the fact that the complex caffeine tannin compounds present in the tea are split up by the treatment. The caffeine is removed and the corresponding tannin material, which remains behind, acts upon the tongue in a tanning manner and in this way disadvantageously influences the nerves of taste.

Albumen as is known has the property of precipitating tannin compounds. Thus it has already been proposed to add albumen to untreated caffeine-containing tea leaves in order to bind the tannin and on infusion to obtain a milder drink resembling tea with an addition of milk.

However, in the present invention the unfavorable action caused by the tannin set free in the removal of the caffeine from the tea is involved. A tea so treated nevertheless shows on infusion the flavour of a strong tea.

It has been found that the disadvantageous influence which tea free from caffeine or having a reduced caffeine content exerts upon the nerves of taste can be overcome if, after removal of the caffeine, a substance is allowed to act upon the tea which binds the tannin present and forms therewith an odourless and tasteless compound. The substances which have proved suitable for this purpose are, for example, albumen, formaldehyde and non-poisonous metal salts which are added in such proportions that the tannin materials originally bound to the caffeine are again bound.

For example a tea freed from its caffeine content has the solvent removed to a far-reaching extent. The tea is then soaked with an aqueous albumen solution, for example a gelatine solution which contains about 0.5 kg. of gelatine for each 100 kgs. of tea. Finally the tea is dried in the usual manner. By using the proportion of gelatine indicated in this example, substantially only the tannin freed from the caffeine-tannin complex by removal of caffeine is bound by the gelatine, while the tannin originally not in the form of a complex with caffeine is substantially unacted upon. This result is explainable on the ground that the tannin liberated from the caffeine-tannin complex is more highly reactive towards gelatine than tannin which was not originally present in the tea leaves in such a complex, and the proportion of gelatine used is sufficient to combine substantially only with the more active tannin liberated from the caffeine-tannin complex when the latter is caused to split by the removal of caffeine from the tea leaves.

Instead of the albumen solution, to 100 kgs. of caffeine-free tea there can be added 100 litres of a mixture which consists of 1 litre of a 40% formalin solution and 99 litres of water.

According to a further example 100 kgs. of caffeine-free tea are soaked with a solution of 0.3 kg. of aluminum lactate in 100 litres of water and finally are dried.

I claim:

1. Process for treating leaf tea from which the caffeine has been removed at least in part, but which contains tannin set free by such removal of caffeine from the caffeine-tannin complex previously contained in the leaf tea, said process comprising treating such leaf tea, containing said free tannin set free from the caffeine-tannin complex, with a material which forms with said free tannin an odorless and tasteless compound and which does not unfavorably influence the taste or odor of the tea.

2. Process for treating leaf tea from which the caffeine has been removed at least in part, but which contains tannin set free by such removal of caffeine from the caffeine-tannin complex previously contained in the leaf tea, said process comprising treating such leaf tea, containing said free tannin set free from the caffeine-tanning complex, with albumen to bind said free tannin.

3. Process for treating leaf tea from which the caffeine has been removed at least in part, but which contains tannin set free by such removal of caffeine from the caffeine-tannin complex previously contained in the leaf tea, said process comprising treating such leaf tea, containing said free tannin set free from the caffeine-tanning complex, with an aqueous solution of gelatine to bind said free tannin.

4. Process for treating leaf tea from which the caffeine has been removed at least in part, but which contains tannin set free by such removal of caffeine from the caffeine-tannin complex previously contained in the leaf tea, said process comprising treating such leaf tea, containing said free tannin set free from the caffeine-tannin complex, with an aqueous solution of gelatine which contains about 0.5 kg. of gelatine for each 100 kgs. of tea.

5. Process for treating leaf tea from which the caffeine has been removed at least in part, but which contains tannin set free upon removal of caffeine from the caffeine-tannin complex previously contained in the leaf tea, said process comprising treating such leaf tea, containing said free tannin from the caffeine-tannin complex, with formaldehyde to bind said free tannin.

6. Process for treating leaf tea from which the caffeine has been removed at least in part, but which contains tannin set free upon removal of caffeine from the caffeine-tannin complex previously contained in the leaf tea, said process comprising treating such leaf tea, containing said free tannin from the caffeine-tannin complex, with a formalin solution of a concentration about equal to 1 litre of 40% formalin in 99 litres of water, about 100 litres of such solution being employed for each 100 kgs. of leaf tea treated.

7. Process for treating leaf tea from which the caffeine has been removed at least in part, but which contains tannin set free upon removal of caffeine from the caffeine-tannin complex previously contained in the leaf tea, said process comprising treating such leaf tea, containing said free tannin from the caffeine-tannin complex, with a non-poisonous metal salt which binds said free tannin.

8. Process for treating leaf tea from which the caffeine has been removed at least in part, but which contains tannin set free upon removal of caffeine from the caffeine-tannin complex previously contained in the leaf tea, said process comprising treating such leaf tea, containing said free tannin from the caffeine-tannin complex, with an aqueous solution containing aluminium lactate containing about 0.3 kg. of aluminium lactate per 100 litres of water, about 100 litres of such solution being employed for each 100 kgs. of leaf tea.

9. Leaf tea from which at least a part of the caffeine has been removed and in which tannin which was previously in a complex with caffeine exists in the form of an odorless and tasteless combination.

10. Decaffeinized leaf tea in which the tannin material therein previously bound to the caffeine removed is bound to gelatine, the said gelatine forming an odorless and tasteless combination with said tannin.

THEODOR GRETHE.